(12) United States Patent
Dailey et al.

(10) Patent No.: US 7,351,947 B2
(45) Date of Patent: Apr. 1, 2008

(54) SYSTEM AND METHOD FOR AMBIENT LIGHT SENSOR TESTING FOR AN INFORMATION HANDLING SYSTEM DISPLAY

(75) Inventors: James E. Dailey, Round Rock, TX (US); Vinod Makhija, Austin, TX (US); Erin L. Price, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 11/439,464

(22) Filed: May 23, 2006

(65) Prior Publication Data

US 2007/0272831 A1 Nov. 29, 2007

(51) Int. Cl.
*G01J 1/32* (2006.01)
*G05D 25/00* (2006.01)
*G09G 3/30* (2006.01)

(52) U.S. Cl. .............................. 250/214 AL; 250/205; 250/214 R; 250/214 B; 345/77; 345/84; 345/102; 345/207; 345/214

(58) Field of Classification Search ............ 250/214 R, 250/214 AL, 214 B, 214.1, 205; 362/559, 362/561; 349/61; 345/207, 214, 84, 87, 345/102, 77; 348/227.1, 229.1, 602
See application file for complete search history.

(56) References Cited

U.S. PATENT DOCUMENTS

| | | | |
|---|---|---|---|
| 5,760,760 A * | 6/1998 | Helms | 345/102 |
| 5,952,992 A * | 9/1999 | Helms | 345/102 |
| 6,094,185 A | 7/2000 | Shirriff | 345/102 |
| 6,337,675 B1 | 1/2002 | Toffolo et al. | 345/77 |
| 6,812,649 B2 | 11/2004 | Kim | 315/149 |
| 6,839,048 B2 | 1/2005 | Park | 345/102 |
| 6,857,759 B2 | 2/2005 | Lee et al. | 362/225 |
| 6,870,529 B1 | 3/2005 | Davis | 345/207 |
| 6,930,898 B2 | 8/2005 | Jeon et al. | 363/98 |
| 6,942,371 B2 | 9/2005 | Chen | 362/561 |
| 6,977,712 B2 * | 12/2005 | Whitted et al. | 349/199 |
| 7,110,062 B1 * | 9/2006 | Whitted et al. | 349/68 |
| 2005/0001951 A1 * | 1/2005 | Whitted et al. | 349/58 |
| 2005/0146651 A1 * | 7/2005 | Whitted et al. | 349/58 |
| 2006/0022934 A1 * | 2/2006 | Whitted et al. | 345/102 |
| 2006/0256067 A1 * | 11/2006 | Montero et al. | 345/102 |

* cited by examiner

*Primary Examiner*—Davienne Monbleau
(74) *Attorney, Agent, or Firm*—Hamilton & Terrile, LLP; Robert W. Holland

(57) ABSTRACT

An ambient light sensor testing module running on an information handling system verifies that an ambient light sensor managing brightness of an information handling system display is active and responding correctly. The testing module sets the display at first and second manually-selectable brightness levels and compares the brightness set from the first and second manually-selectable brightness levels when the ambient light sensor is engaged to set display brightness. An excessive difference between the brightness set by the ambient light sensor from the first and second manually-selectable brightness levels indicates a faulty ambient light sensor.

20 Claims, 2 Drawing Sheets

SYSTEM AND METHOD FOR AMBIENT LIGHT SENSOR TESTING FOR AN INFORMATION HANDLING SYSTEM DISPLAY

BACKGROUND OF THE INVENTION

1. Field of the Invention

The present invention relates in general to the field of information handling system displays, and more particularly to a system and method for ambient light sensor testing.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have, in particular, grown in popularity among end users. Portable information handling systems have integrated displays and an internal power source, such as a battery, so that end users may carry the system around while the system is operating. Portable information handling systems that interface through wireless networks allow end users to carry their office virtually anywhere. Since portable information handling systems are easily carried by an end user through different types of lighting environments, the systems typically include an interface to allow the end user to adjust display brightness. For instance, the key combination of function and up arrow increases display brightness while the key combination of function down arrow decreases display brightness. Generally, a plurality of brightness adjustment steps are available with each manual increase or decrease resulting in a step up or a step down of brightness. However, manual adjustments to brightness are often inconvenient for end users, especially where two hands are required while the end user is carrying the portable information handling system.

Ambient light sensors provide an automated way to adjust display brightness for varying external lighting conditions. Ambient light sensors measure the external light conditions and adjust the power to the display backlight to brighten the display when external lighting becomes more bright and to dim the display when external lighting becomes more dim. Automated brightness control allows an end user to continue using a portable information handling system as ambient lighting conditions change with minimal disruption to the presentation at the display. Displays having brightness automatically managed with an ambient light sensor avoid "over-bright" conditions which increase the stress on the backlight and more rapidly decrease battery power. However, including an ambient light sensor in a portable information handling system tends to increase the complexity of the manufacture of the system. For example, in order to test the operations of an ambient light sensor, a calibrated external light source, multimeters and user interaction are typically needed to determine whether the ambient light sensor is active and responding correctly. Such testing is time consuming, labor intensive, cumbersome and not easily performed out side of a laboratory, such as at an end user location.

SUMMARY OF THE INVENTION

Therefore a need has arisen for a system and method which tests an ambient light sensor managing brightness at an information handling system display.

In accordance with the present invention, a system and method are provided which substantially reduce the disadvantages and problems associated with previous methods and systems for testing an ambient light sensor. Ambient light sensor adjustments from first and second manually-selectable brightness levels are compared to verify that the ambient light sensor is active and accurately correcting screen brightness in response to detected ambient light levels.

More specifically, a testing module integrated in a portable information handling system automatically tests an ambient light sensor associated with an integrated display. The testing module commands the display to a first manually-selectable brightness, such as minimum brightness, and then engages the ambient light sensor to bring the display to a brightness managed by the ambient light sensor. The brightness setting of the ambient light sensor is determined after a slight delay for stabilization, and then the testing module commands the display to a second manually-selectable brightness, such as maximum brightness. The testing module again engages the ambient light sensor to bring the display to a brightness managed by the ambient light sensor and the brightness setting of the ambient light sensor is determined after a slight delay for stabilization. To determine that the ambient light sensor is active and providing accurate adjustments for sensed ambient light, the two separate ambient light sensor brightness settings are compared. The ambient light sensor fails if the two brightness settings have greater than a predetermined difference and passes if the two brightness settings are substantially the same.

The present invention provides a number of important technical advantages. One example of an important technical advantage is that ambient light sensor management of display brightness is quickly and simply tested for responsiveness. Active and correct ambient light sensor operations are tested at an information handling system without external equipment so that the test may be automatically initiated at an end user location. Test results are electronically available without user intervention so that the test may be accomplished as part of the manufacture process for an information handling system without additional labor and with automated reporting to a diagnostics server through a network.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Ambient light sensor testing capability is integrated within a portable information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
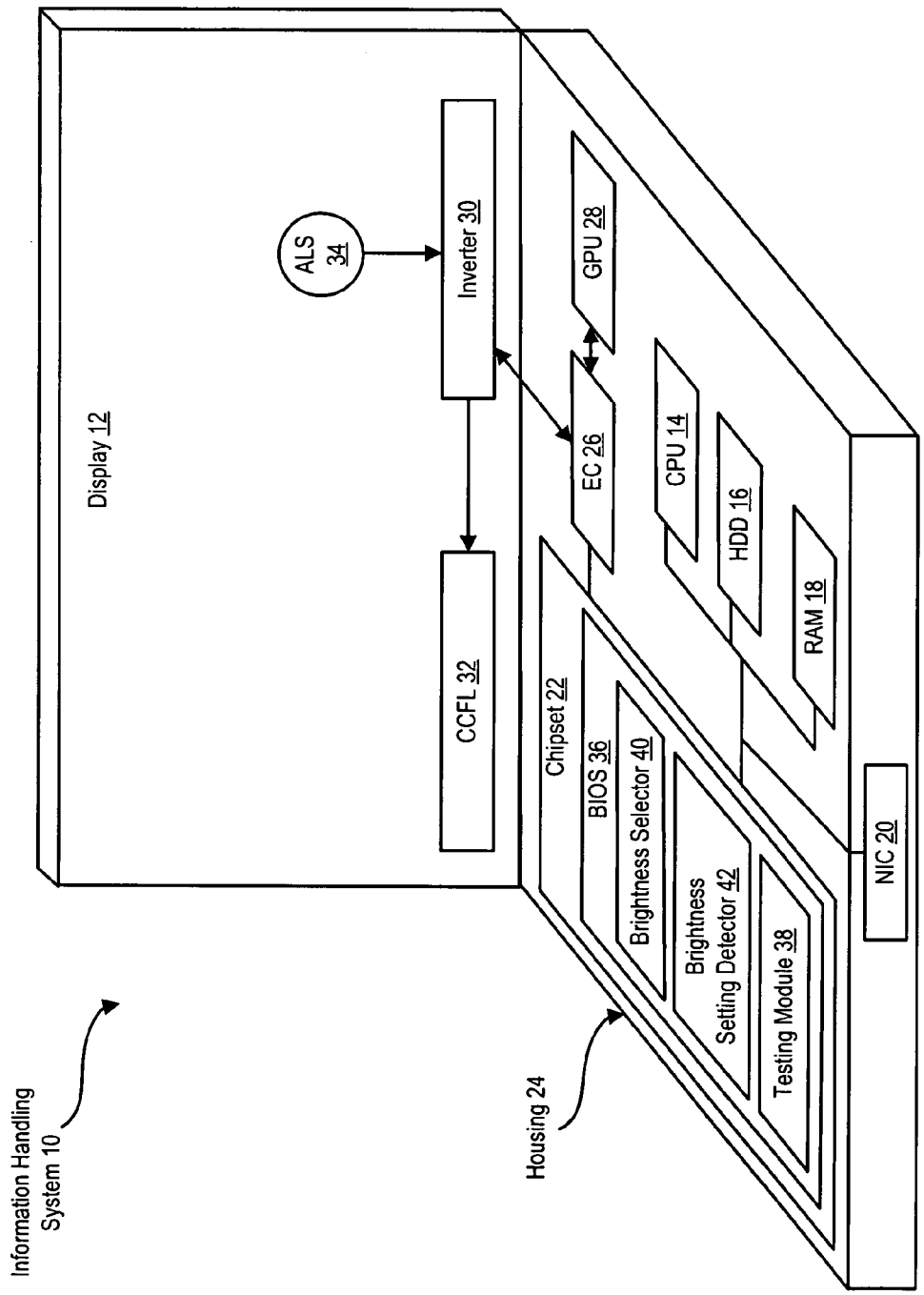
FIG. 1 depicts a block diagram of an information handling system having an ambient light sensor testing module.

Referring now to FIG. 1, a block diagram depicts an information handling system 10 having an ambient light sensor testing module. Information handling system 10 is configured as a portable system having an integrated liquid crystal display (LCD) 12 to present visual information generated by processing components, such as a CPU 14, hard disk drive 16, RAM 18, network interface card 20 and chipset 22, which are disposed in a housing 24. An embedded controller 26 receives user inputs through input devices and a graphics processor unit (GPU) 28 formats visual information for presentation at display 12. An inverter 30 provides power to a backlight, CCFL 32, which illuminates the image presented at display 12. Inverter 30 provides variable settings of power to backlight 32 to provide variable brightness levels. Brightness settings are automatically varied based on ambient light detected proximate display 12 by an ambient light sensor (ALS) 34. For example, as ALS 34 detects increased levels of ambient light brightness, inverter 30 provides increased brightness settings for illuminating backlight 32. As ALS 34 detects decreased levels of ambient light brightness, inverter 30 provides decreased brightness settings for illuminating backlight 32. Brightness settings are, alternatively, manually selectable based on user inputs, such as the function up/down arrow combination input through embedded controller 26. For instance, eight step brightness values are manually-selectable from a minimum brightness setting to a maximum brightness setting.

In order to test the operation of ALS 34, firmware instructions are integrated into a processing component, such as a microcontroller operating in inverter 30, embedded controller 26 or a BIOS 36 running on chipset 22, which alters brightness settings at inverter 30 and checks that ALS 34 returns the brightness setting to substantially the same value. For instance, a testing module 38 is included in BIOS 36 to test the repeatability of the response of ALS 34. Testing module 38 automatically commands a brightness selector 40 to set the manually-selectable minimum value at inverter 30. Testing module 38 then automatically engages ALS 34 to adjust the brightness of display 12 to compensate for ambient lighting conditions. After a slight delay to stabilize the brightness setting made by ALS 34, a brightness setting detector 42 reads the brightness setting at inverter 30. After the reading is complete, testing module 38 next automatically commands brightness selector 40 to set the manually-selectable maximum value at inverter 30. Testing module 38 then once again automatically engages ALS 34 to adjust the brightness of display 12 to compensate for ambient lighting conditions. After a slight delay, brightness setting detector 42 reads the brightness setting at inverter 30 as set by ALS 34. Testing module 38 compares the two ALS brightness settings read by brightness setting detector 42 to determine an ALS failure if the difference is too great or to determine an ALS pass if the two ALS brightness settings are substantially similar. The pass or fail status may be communicated to a network location through NIC 20 or presented at display 12. Because ALS testing is internally supported, an ALS test may be automatically performed during manufacture and communicated to a diagnostics server to ensure proper ALS operation before shipment of the information handling system.

Figure 2:
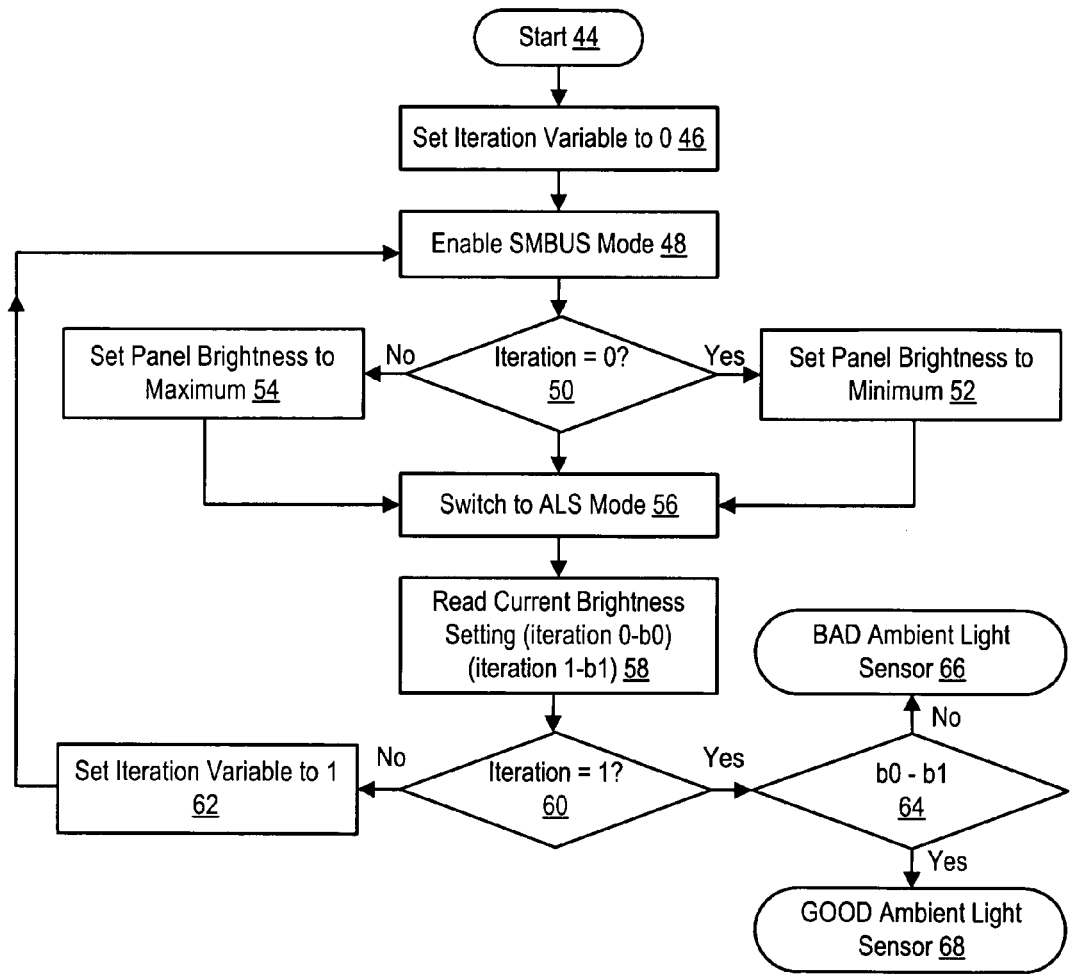
FIG. 2 depicts a flow diagram of a process for testing an ambient light sensor.

Referring now to FIG. 2, a flow diagram depicts a process for testing an ambient light sensor. The process starts at step 44 with initiation of an ALS test and continues to step 46 to set the test iteration value to zero. At step 48, the SMBus mode is enabled to support two-way communication between the inverter and the testing module. At step 50, a determination is made of whether the test iteration value is zero, and, if so, the process continues to step 52 to set the display panel brightness to maximum. If at step 50 the iteration is not zero, such as will occur with the loop iteration explained below, the process continues to step 54 to set the display panel brightness to minimum. From steps 52 or 54, the process continues to step 56 to switch from manually-selectable brightness settings to management of brightness by the ALS. At step 58, the current brightness setting is read as commanded by the ALS and assigned a variable of b0 for the first iteration and b1 for the second iteration. At step 60 a determination is made of whether the iteration is equal to one. If not, the process continues to step 62 to set the iteration value to one and back to step 48 to complete the second iteration of the loop. If at step 60 the iteration value is one, then values exist for both b0 and b1 and the process continues to step 64 to compare the values of b0 and b1. If the comparison at 64 indicates a difference between b0 and b1 that is greater than a predetermined value, the process continues to step 66 to indicate a bad ambient light sensor. If the comparison at step 64 shows that the values of b0 and b1 are substantially the same, the process continues to step 68 to indicate a good ambient light sensor.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   plural processing components disposed in the housing and operable to generate visual information for presentation at a display;
   a display integrated with the housing and interfaced with the processing components, the display operable to present the visual information at plural manually-selectable brightness levels;
   an ambient light sensor interfaced with the display, the ambient light sensor operable to detect ambient light proximate the display and to automatically adjust the display brightness level in response to the detected ambient light; and a testing module interfaced with the display and the ambient light sensor, the testing module operable to test ambient light sensor automatic brightness adjustments by comparing the ambient light sensor brightness adjustment from a first manually-selectable brightness level to a first ambient light sensor brightness level with the ambient light sensor brightness adjustment from a second manually-selectable brightness level to a second ambient light sensor brightness level.

2. The information handling system of claim 1 wherein the first and second manually-selectable brightness levels comprise a maximum manually-selectable brightness level and a minimum manually-selectable brightness level.

3. The information handling system of claim 1 wherein comparing the ambient light sensor brightness adjustments further comprises:

automatically setting the display brightness at the first manually-selectable brightness level;
automatically engaging the ambient light sensor;
determining a first brightness level set by the ambient light sensor;
automatically setting the display brightness at the second manually-selectable brightness level;
automatically engaging the ambient light sensor;
determining a second brightness level set by the ambient light sensor; and
determining a difference between the first and second brightness set by the ambient light sensor.

4. The information handling system of claim 3 wherein comparing the ambient light sensor brightness adjustments levels further comprises:

determining that the difference between the first and second brightness levels is less than a predetermined amount; and
issuing an ambient light sensor pass from the test module.

5. The information handling system of claim 3 wherein comparing the ambient light sensor brightness adjustments further comprises:

determining that the difference between the first and second brightness levels is greater than a predetermined amount; and
issuing an ambient light sensor fail from the test module.

6. The information handling system of claim 5 wherein the testing module is further operable to communicate the ambient light sensor fail to a network location.

7. The information handling system of claim 1 wherein the processing components comprise an embedded controller and the testing module comprises firmware running on the embedded controller.

8. The information handling system of claim 1 wherein the processing components comprise a chipset supporting a BIOS and the testing module comprises firmware running in the BIOS.

9. The information handling system of claim 1 wherein the processing components comprise an inverter having a microcontroller, the inverter setting the brightness of the display, and wherein the testing module comprises firmware running on the inverter microcontroller.

10. A method for testing an information handling system display ambient light sensor, the method comprising:

setting display brightness at a first manually-selectable brightness level;
engaging the ambient light sensor;
determining a first brightness level set by the ambient light sensor;
setting display brightness at a second manually-selectable brightness level;
engaging the ambient light sensor;
determining a second brightness level set by the ambient light sensor; and
determining a difference between the first and second brightness levels set by the ambient light sensor.

11. The method of claim 10 further comprising:

determining that the difference between the first and second brightness levels is less than a predetermined amount; and
passing the ambient light sensor.

12. The method of claim 10 further comprising:

determining that the difference between the first and second brightness levels is greater than a predetermined amount; and
failing the ambient light sensor.

13. The method of claim 12 further comprising communicating the failing to a network location.

14. The method of claim 10 wherein the first brightness level comprises a maximum brightness setting and the second brightness level comprises a minimum brightness setting.

15. The method of claim 10 wherein the ambient light sensor manages brightness at a portable information handling system liquid crystal display.

16. A system for testing an ambient light sensor managing brightness of a display, the system comprising:

a brightness selector operable to set the display brightness to first and second brightness settings;
a brightness setting detector operable to detect the brightness set by the ambient light sensor; and
a testing module interfaced with the brightness selector and the brightness setting detector, the testing module operable to compare the brightness set by the ambient light sensor after adjustment by the ambient light sensor from the first and second brightness levels.

17. The system of claim 16 wherein the testing module compares the ambient light sensor brightness adjustments from the first and second brightness levels by:

automatically setting the display brightness at the first brightness setting;
automatically engaging the ambient light sensor;
determining a first brightness set by the ambient light sensor;
automatically setting the display brightness at the second b rightness level;
automatically engaging the ambient light sensor;
determining a second brightness set by the ambient light sensor; and
determining a difference between the first and second brightnesses set by the ambient light sensor.

18. The system of claim 17 wherein the brightness selector first and second brightness settings comprise a maximum manually-selectable brightness and a minimum manually-selectable brightness.

19. The system of claim 17 wherein the testing module passes the ambient light sensor if the difference between the first and second brightness set by the ambient light sensor are greater than a predetermined amount.

20. The system of claim 17 wherein the testing module fails the ambient light sensor if the differences between the first and second brightnesses set by the ambient light sensor are less than a predetermined amount.

* * * * *